(12) United States Patent
Morita

(10) Patent No.: US 10,326,270 B2
(45) Date of Patent: Jun. 18, 2019

(54) DC POWER TRANSMISSION DEVICE, DC POWER RECEPTION DEVICE, AND DC POWER TRANSMISSION SYSTEM

(71) Applicant: SONY CORPORATION, Tokyo (JP)

(72) Inventor: Tadashi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 289 days.

(21) Appl. No.: 15/326,205

(22) PCT Filed: Jul. 10, 2015

(86) PCT No.: PCT/JP2015/069970
§ 371 (c)(1),
(2) Date: Jan. 13, 2017

(87) PCT Pub. No.: WO2016/021371
PCT Pub. Date: Feb. 11, 2016

(65) Prior Publication Data
US 2017/0201093 A1 Jul. 13, 2017

(30) Foreign Application Priority Data

Aug. 5, 2014 (JP) .................................. 2014-159439

(51) Int. Cl.
*H02J 1/00* (2006.01)
*H02J 3/38* (2006.01)
(Continued)

(52) U.S. Cl.
CPC .................. *H02J 1/00* (2013.01); *H02J 1/08* (2013.01); *H02J 1/102* (2013.01); *H02J 3/382* (2013.01);
(Continued)

(58) Field of Classification Search
CPC ........ H02J 1/00; H02J 1/06; H02J 1/08; H02J 1/10
(Continued)

(56) References Cited

U.S. PATENT DOCUMENTS 6,125,048 A * 9/2000 Loughran ................. H02J 1/06
323/206

FOREIGN PATENT DOCUMENTS

JP 2006-129585 A 5/2006
JP 2009-165247 A 7/2009
(Continued)

*Primary Examiner* — Fritz M Fleming
(74) *Attorney, Agent, or Firm* — Chip Law Group

(57) ABSTRACT

[Object] To provide a DC power transmission device capable of supplying properly a previously agreed amount of power between the power transmission side and the power reception side when customers supply power to each other. [Solution] Provided is the DC power transmission device including: a power supply request acquisition unit configured to acquire a power supply request from a DC power reception device, the DC power reception device being configured to receive DC power from a DC bus line; and a transmission power decision unit configured to decide a parameter of DC power to be outputted to the DC power reception device via the DC bus line based on the power supply request and a characteristic of a power storage device, the power storage device being configured to supply DC power to the DC bus line. The parameter includes power transmission time of DC power that reflects a power transmission loss occurred until DC power reaches the DC power reception device.

10 Claims, 7 Drawing Sheets

(51) Int. Cl.
  *H02J 7/00* (2006.01)
  *H02J 13/00* (2006.01)
  *H02M 3/04* (2006.01)
  *H02J 1/08* (2006.01)
  *H02J 1/10* (2006.01)

(52) U.S. Cl.
  CPC .............. *H02J 3/383* (2013.01); *H02J 3/386* (2013.01); *H02J 7/0068* (2013.01); *H02J 13/0003* (2013.01); *H02M 3/04* (2013.01); *Y02E 10/763* (2013.01); *Y02E 40/72* (2013.01); *Y04S 10/123* (2013.01)

(58) Field of Classification Search
  USPC ........................................................ 307/103
  See application file for complete search history.

(56) References Cited

FOREIGN PATENT DOCUMENTS

| | | |
|---|---|---|
| JP | 2011-205871 A | 10/2011 |
| JP | 2012/162570 A1 | 11/2012 |
| JP | 2013-090560 A | 5/2013 |
| JP | 2014-054022 A | 3/2014 |
| WO | 2008/047400 A1 | 4/2008 |
| WO | 2012/162570 A1 | 11/2012 |

\* cited by examiner

DC POWER TRANSMISSION DEVICE, DC POWER RECEPTION DEVICE, AND DC POWER TRANSMISSION SYSTEM

CROSS REFERENCE TO RELATED APPLICATIONS

This application is a U.S. National Phase of International Patent Application No. PCT/JP2015/069970 filed on Jul. 10, 2015, which claims priority benefit of Japanese Patent Application No. JP 2014-159439 filed in the Japan Patent Office on Aug. 5, 2014. Each of the above-referenced applications is hereby incorporated herein by reference in its entirety.

TECHNICAL FIELD

The present disclosure relates to a DC power transmission device, a DC power reception device, and a DC power transmission system.

BACKGROUND ART

There is known an uninterruptible power supply device provided with a storage battery for continuously supplying power from the storage battery to equipment connected thereto during a predetermined time without causing power failure even if power from an input power source is interrupted. Techniques are developed for furnishing each customer with such a power supply device and supplying consumers with power when an abnormality occurs in supplying power due to power failure, shortage in remaining capacity of storage battery, or other reasons (see Patent Literatures 1 and 2).

CITATION LIST

Patent Literature

Patent Literature 1: JP 2011-205871A
Patent Literature 2: JP 2013-090560A

DISCLOSURE OF INVENTION

Technical Problem

When customers supply each other with power, it is desirable, for the sake of efficiency, to supply DC power in consideration of supply of power from a storage battery. When customers supply each other with DC power, a previously agreed amount of power is necessary to be supplied properly between power transmission and reception sides.

Therefore, the present disclosure provides a novel and improved DC power transmission device, DC power reception device, and DC power transmission system, capable of supplying properly a previously agreed amount of power between the power transmission side and the power reception side when customers supply each other with DC power.

Solution to Problem

According to the present disclosure, there is provided a DC power transmission device including: a power supply request acquisition unit configured to acquire a power supply request from a DC power reception device, the DC power reception device being configured to receive DC power from a DC bus line; and a transmission power decision unit configured to decide a parameter of DC power to be outputted to the DC power reception device via the DC bus line based on the power supply request and a characteristic of a power storage device, the power storage device being configured to supply DC power to the DC bus line. The parameter includes power transmission time of DC power that reflects a power transmission loss occurred until DC power reaches the DC power reception device.

According to the present disclosure, there is provided a DC power reception device including: a power supply request generation unit configured to generate a power supply request based on a characteristic of a power storage device, the power storage device being configured to store a received power; a power supply request transmitting unit configured to transmit the power supply request to a DC power transmission device, the DC power transmission device being configured to transmit DC power to a DC bus line; and a power transmission information acquisition unit configured to decide a parameter of DC power to be generated by the DC power transmission device and transmitted from the DC power transmission device. The parameter includes power transmission time of DC power that reflects a power transmission loss occurred until DC power transmitted from the DC power transmission device reaches.

According to the present disclosure, there is provided a DC power transmission system including: a DC power reception device configured to receive DC power from a DC bus line; and a DC power transmission device configured to transmit DC power to the DC bus line. The DC power reception device includes a power supply request generation unit configured to generate a power supply request based on a characteristic of a power storage device, the power storage device being configured to store a received power, a power supply request transmitting unit configured to transmit the power supply request to the DC power transmission device, and a power transmission information acquisition unit configured to decide a parameter of DC power to be generated by the DC power transmission device and transmitted from the DC power transmission device. The DC power transmission device includes a power supply request acquisition unit configured to acquire the power supply request from the DC power reception device, and a transmission power decision unit configured to decide a parameter of DC power to be outputted to the DC power reception device via the DC bus line based on the power supply request and a characteristic of a power storage device, the power storage device being configured to supply DC power to the DC bus line. The parameter includes power transmission time of DC power that reflects a power transmission loss occurred until DC power transmitted from the DC power transmission device reaches.

Advantageous Effects of Invention

According to the present disclosure described above, it is possible to provide a novel and improved DC power transmission device, DC power reception device, and DC power transmission system, capable of supplying properly the previously agreed amount of power between the power transmission side and the power reception side when customers supply each other with DC power.

Note that the effects described above are not necessarily limitative. With or in the place of the above effects, there

MODE(S) FOR CARRYING OUT THE INVENTION

Figure 1:
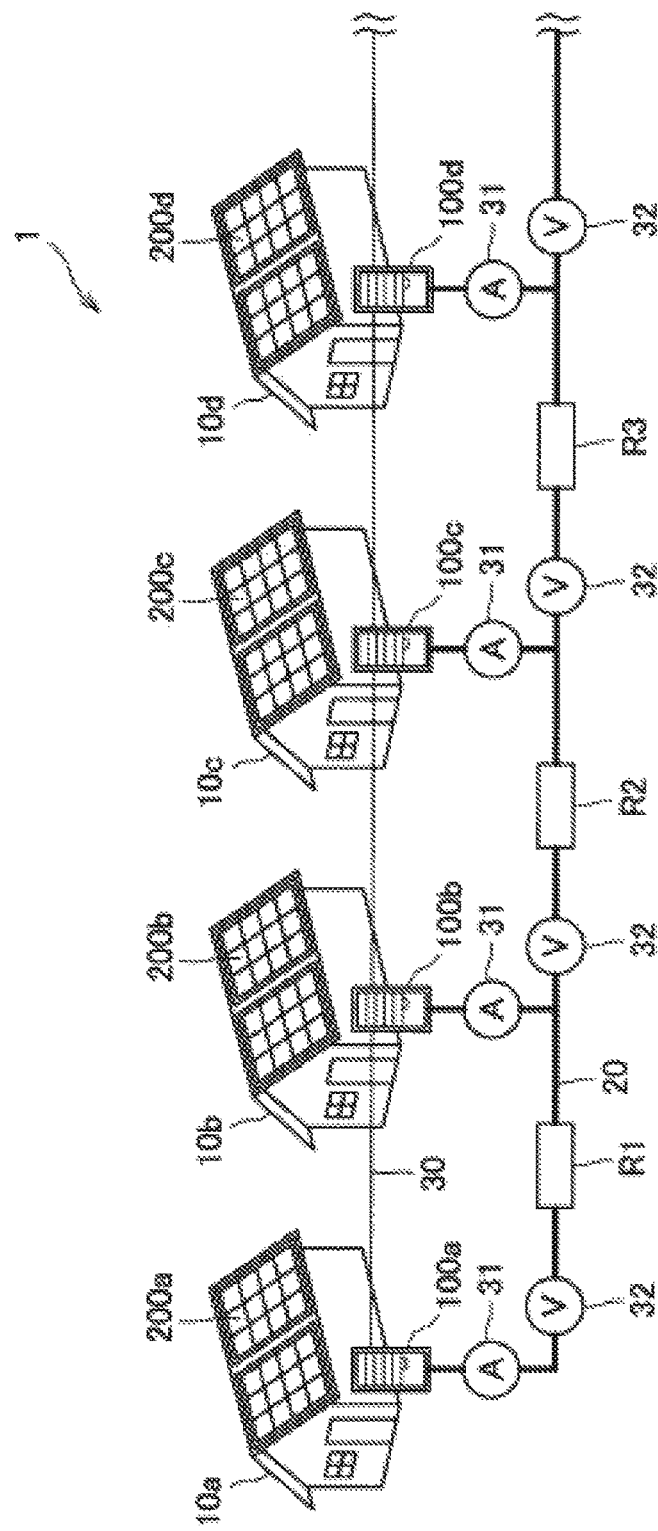
FIG. 1 is a diagram illustrated to describe an exemplary overall configuration of a power transmission and reception control system according to an embodiment of the present disclosure.

Hereinafter, (a) preferred embodiment(s) of the present disclosure is described in detail with reference to the appended drawings. In this specification and the appended drawings, structural elements that have substantially the same function and structure are denoted with the same reference numerals, and repeated explanation of these structural elements is omitted.

The description will be made in the following order.
1. Embodiment of Present Disclosure
1.1. Overview
1.2. Exemplary System Configuration
1.3. Exemplary Operation
2. Conclusion

1. Embodiment of Present Disclosure

[1.1. Overview]

An overview of an embodiment of the present disclosure is described prior to the description of an embodiment of the present disclosure.

The description is based on the assumption that an environment in which each consumer is provided with a battery server having a storage battery, the storage battery stores power using power generated from a commercial power supply or a natural energy source such as solar, wind, and geothermal, and power stored in the storage battery drives electrical appliances becomes increasingly popular. With the spread of such environment, a power interchange system for interchanging power between consumers is designed. In a case where power is insufficient in a battery server of a consumer as described above, the power interchange system allows a battery server of a consumer having extra power to supply a battery server of the consumer having insufficient power with power. When consumers supply each other with power, it is preferable, for the sake of efficiency, to supply DC power in consideration of the supply of power from a storage battery.

When customers supply each other with DC power, it is preferable to determine previously an amount of power transmission to be exchanged between the power transmission side and the power reception side. The previously agreed amount of power is necessary to be supplied properly between the power transmission side and the power reception side. This is because the transmission and reception of the proper amount of power between the power transmission side and the power reception side are necessary to exchange power between the power transmission side and the power reception side.

However, when DC power is transmitted, a transmission loss occurs due to resistance of a power transmission line. In other words, even if the power transmission side decides a power transmission voltage, the voltage drops due to a resistance component of the power transmission line on the power reception side. It is difficult for the power reception side to know exactly whether the transmission loss occurs due to resistance of the power transmission line. This is because the power transmission side may possibly transmit the reduced power intentionally.

An approach for deciding the amount of power to be transmitted from the power transmission side is conceivable by handing power transmission stop control over to the power reception side in the state in which the power reception side receives the entire power of the previously agreed amount. However, in this approach, it is not possible for the power transmission side to predict the time when the power transmission can be stopped, to plan a power transmission schedule after the power transmission stop, or to measure the loss occurred when the power is transmitted to the power reception side. Thus, in this approach for allowing the power transmission side to hand the control to stop power transmission over to the power reception side, it is not possible for the power transmission side to predict the power consumption.

There may be a case in which the power transmission side decides the amount of power transmission by the product of the power transmission voltage, the power transmission current, and the power transmission time. In this case, the fluctuation in the power reception voltage on the power reception side due to a load on the power grid or the power transmission occurred newly in the middle of the power grid may be ignored. Thus, the power reception side is likely to be unduly responsible for the entire loss occurred with the fluctuation in the power reception voltage on the power reception side.

It is necessary for the power transmission side to change the power transmission current depending on the state of a battery server on the power transmission side or the state of a battery server on the power reception side. The transmission power is determined by the product of voltage, current, and time, and thus, when the voltage and the current are set to a high value enough, the power transmission is advantageously completed in a short period of time. However, the power is likely to fail to be transmitted at the set value depending on the state of a battery server on the power transmission side or the power reception side.

Therefore, the disclosers of the present specification have made intensive studies to provide a technology capable of properly supplying the amount of power previously agreed between the power transmission side and the power reception side while preventing the occurrence of events as described above when customers supply each other with DC power. Thus, the disclosers of the present specification have developed the technology capable of properly supplying the amount of power previously agreed between the power transmission side and the power reception side while preventing the occurrence of events as described above when customers supply each other with DC power, which will be described later.

An overview of an embodiment of the present disclosure has been described. Next, an exemplary functional configuration of the power transmission and reception control system according to an embodiment of the present disclosure is described.

[1.2. Exemplary System Configuration]

FIG. 1 is a diagram illustrated to describe an exemplary overall configuration of the power transmission and reception control system according to an embodiment of the present disclosure. FIG. 1 illustrates an exemplary overall configuration of the power transmission and reception control system that interchanges DC power between battery servers having their own storage batteries. An exemplary overall configuration of the power transmission and reception control system according to an embodiment of the present disclosure is described with reference to FIG. 1.

As illustrated in FIG. 1, the power transmission and reception control system 1 is a system constructed to supply each other with DC power as necessary among battery servers provided in the respective consumers (four in FIG. 1). A consumer 10a is provided with a battery server 100a. Similarly, a customer 10b, a customer 10c, and a customer 10d are provided with a battery server 100b, a battery server 100c, and a battery server 100d, respectively. Each of the battery servers 100a to 100d has a rechargeable battery provided internally in or externally attached to each battery server.

The battery servers 100a to 100d are connected to a DC bus line 20 through which DC power is mutually supplied among the battery servers as necessary. Each of the battery servers 100a to 100d is provided with a bidirectional DC-DC converter configured to convert voltage of a battery and voltage of the DC bus line 20 from one level to another. Each of the battery servers 100a to 100d is connected to a communication line 30. When the battery servers 100a to 100d supply each other with DC power via the DC bus line 20, the battery servers 100a to 100d transmit and receive information via the communication line 30. Although the communication line 30 is illustrated as being wired in FIG. 1, the communication line 30 may be wireless.

The consumers 10a to 10d may be provided with solar panels 200a to 200d, respectively. Each of the solar panels 200a to 200d receives irradiation of sunlight and generates power. The solar panels 200a to 200d are configured so that the generated power can be stored in batteries provided in the respective battery servers 100a to 100d. The power stored in the battery servers 100a to 100d may be power that is generated by natural energy, such as wind and geothermal, other than sunlight.

The power transmission and reception control system 1 according to the present embodiment is characterized to provide a mechanism for arbitrating power transmission and reception among the battery servers 100a to 100d so that only one of the battery servers 100a to 100d connected to the DC bus line 20 has a right to control the transmission and reception of DC power via the DC bus line 20. In other words, the power transmission and reception control system 1 according to the present embodiment is configured to have a mechanism that allows only a battery server having the control right among the battery servers 100a to 100d to instruct other battery servers to transmit power stored in their own batteries or to receive power for charging their own batteries and prevents a battery server having no control right from performing the power transmission and reception without permission.

In this way, only one of the battery servers 100a to 100d connected to the DC bus line 20 has the right to control the transmission and reception of DC power to and from other battery servers via the DC bus line 20. This makes it possible for the power transmission and reception control system 1 according to the present embodiment to avoid an event caused in the case where the roles are simply shared between a master and a slave as described above and to efficiently manage the right to control the power transmission and reception of DC power. The power transmission and reception control system 1 according to the present embodiment efficiently manages the right to control the power transmission and reception of DC power, thereby keeping the order of objects to be controlled among the battery servers.

Each of the battery servers 100a to 100d is configured to acquire a current value from an ammeter 31 and to acquire a voltage value from a voltmeter 32. The current and voltage values are measured at the points connected to the DC bus line 20. Each of the battery servers 100a to 100d exchanges information on the current value and the voltage value with each other via the communication line 30. The battery servers 100a to 100d control their respective bidirectional DC-DC converters based on information on the current value and the voltage value acquired via the communication line 30.

In this way, in the case where the power transmission and reception of DC power are performed between the battery servers 100a to 100d via the DC bus line 20, the voltage drop may occur due to resistance of the DC bus line when the power is transmitted from the power transmission side to the power reception side as described above. In FIG. 1, resistance between the battery servers 100a and 100b is denoted by R1, resistance between the battery servers 100b and 100c is denoted by R2, and resistance between the battery servers 100c and 100d is denoted by R3. An example of voltage drop due to resistance of the DC bus line 20 is described.

Figure 2:
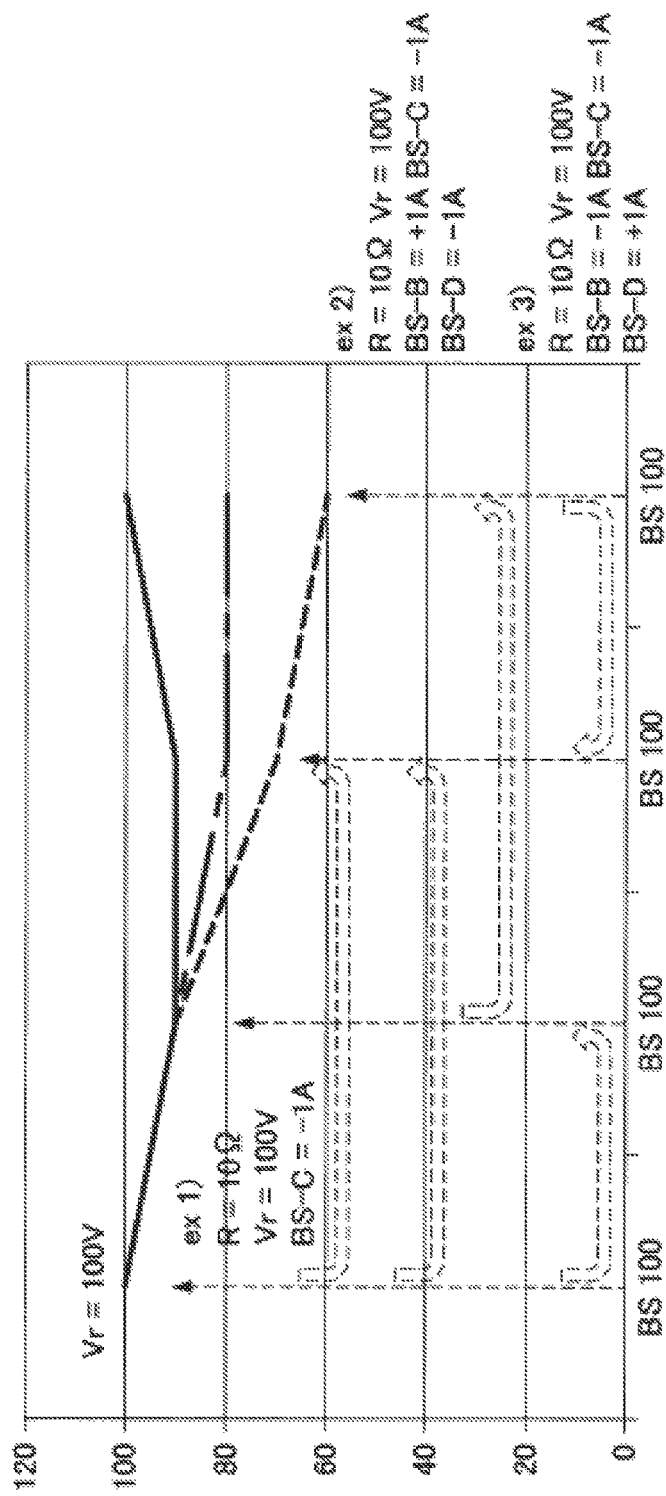
FIG. 2 is a diagram illustrated to describe an example of voltage drop due to resistance of a DC bus line 20.

FIG. 2 is a diagram illustrated to describe an example of voltage drop due to resistance of the DC bus line 20 in the case where DC power transmission and reception via the DC bus line 20 are performed among the battery servers 100a to 100d. In the example illustrated in FIG. 2, each resistance level between battery servers (BSs) is set to 10Ω.

As a first example, an example of voltage drop due to resistance of the DC bus line 20 in the case where the battery server 100a transmits DC power to the battery server 100c is illustrated. In the case where the battery server 100a outputs DC power at a voltage of 100 V and the battery server 100c receives DC power from the DC bus line 20 at a current of 1 A, the voltage at the point of the battery server 100a is 100 V. However, the voltage at the point of the battery server 100c decreases by 20 V to 80 V.

As another example, an example in which voltage drops due to resistance of the DC bus line 20 in the case where the battery servers 100a and 100b transmit DC power to the battery servers 100c and 100d, respectively, is illustrated. In the case where each of the battery servers 100a and 100b outputs DC power at a voltage of 100 V and each of the battery servers 100c and 100d receives DC power from the DC bus line 20 at a current of 1 A, the voltage at the point of the battery server 100a is 100 V. However, the voltage at the point of the battery server 100c decreases by 30 V to 70 V, and the voltage at the point of the battery server 100d decreases by 10 V to 60 V.

As still another example, an example in which voltage drops due to resistance of the DC bus line 20 in the case where the battery servers 100a and 100d transmit DC power to the battery servers 100b and 100c, respectively, is illustrated. In the case where each of the battery servers 100a and 100d outputs DC power at a voltage of 100 V and each of the battery servers 100b and 100c receives DC power from the DC bus line 20 at a current of 1 A, the voltage at the point of each of the battery servers 100a and 100d is 100 V. However, the voltage at the point of each of the battery servers 100b and 100c decreases by 10 V to 90 V.

In this way, in the case where the battery servers 100a to 100d transmit or receive DC power via the DC bus line 20, the voltage on the power reception side is lower than the voltage on the power transmission side by resistance of the DC bus line 20. Thus, when the battery servers 100a to 100d serving as the power transmission side establish an agreement of power transmission and reception prior to the power transmission and reception of DC power, the battery servers 100a to 100d preferably set time, which is necessary for receiving an amount of power that is desired by the power reception side, to be longer than ideal time, and notify the set time to the power reception side.

Thus, each of the battery servers 100a to 100d serving as the power transmission side decides a parameter to be used in transmitting DC power prior to the transmission and reception of DC power. In this case, each of the battery servers 100a to 100d decides a parameter including power transmission time in consideration of transmission loss due to the DC bus line 20. The battery servers 100a to 100d serving as the power transmission side may acquire the status of power transmission and reception performed in the DC bus line 20 to decide a parameter to be used in transmitting DC power based on the status of power transmission and reception.

Figure 3:
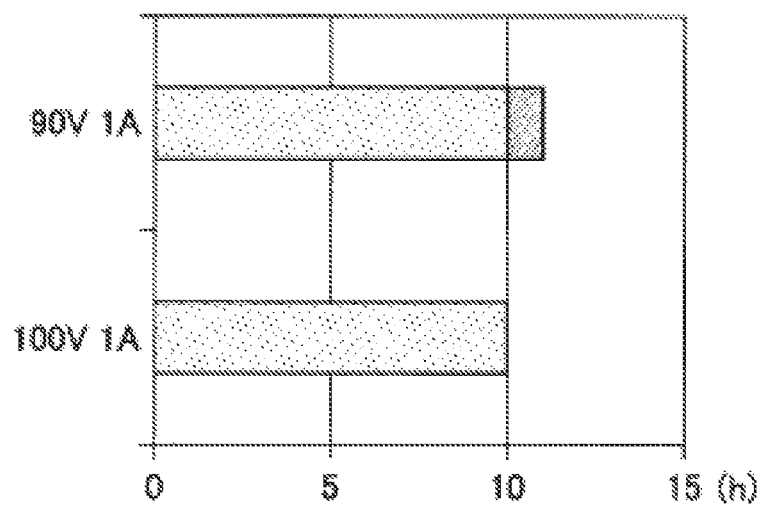
FIG. 3 is a diagram illustrated to describe how power transmission time changes with voltage.

FIG. 3 is a diagram illustrated to describe how power transmission time changes with voltage. In one example, in the case where the power transmission side transmits power of 1 kWh at a voltage of 100 V, if a power reception condition on the power reception side is set to a voltage of 100 V and to a current of 1 A (i.e., no voltage drop occurs), the power transmission can be completed in 10 hours. However, if a power reception condition on the power reception side is set to a voltage of 90 V and to a current of 1 A, the power transmission fails to be completed in 10 hours and even it takes about 11 hours or more.

Thus, in the case where the battery servers 100a to 100d on the power reception side that receive power at a current of 1 A requests power of 1 kWh, the battery servers 100a to 100d serving as the power transmission side decide power transmission time that reflects the transmission loss and notify it to the battery servers 100a to 100d on the power reception side to allow the power reception side to determine it. If the battery servers 100a to 100d on the power reception side can accept the power transmission time, the battery servers 100a to 100d on the power transmission side transmit DC power to the battery servers 100a to 100d on the power reception side via the DC bus line 20 at the power transmission time that reflects the transmission loss.

The decision of such power transmission time that reflects transmission loss by the battery servers 100a to 100d according to an embodiment of the present disclosure allows the battery servers 100a to 100d on the power transmission side to take a decision to start power transmission and to predict power transmission time with time enough to compensate the transmission loss. The power transmission by the battery servers 100a to 100d on the power reception side at the power transmission time that reflects transmission loss allows the requested power to be exactly received.

An exemplary overall configuration of the power transmission and reception control system according to an embodiment of the present disclosure has been described with reference to FIG. 1. Subsequently, an exemplary functional configuration of the power transmission and reception control system according to an embodiment of the present disclosure is described.

Figure 4:
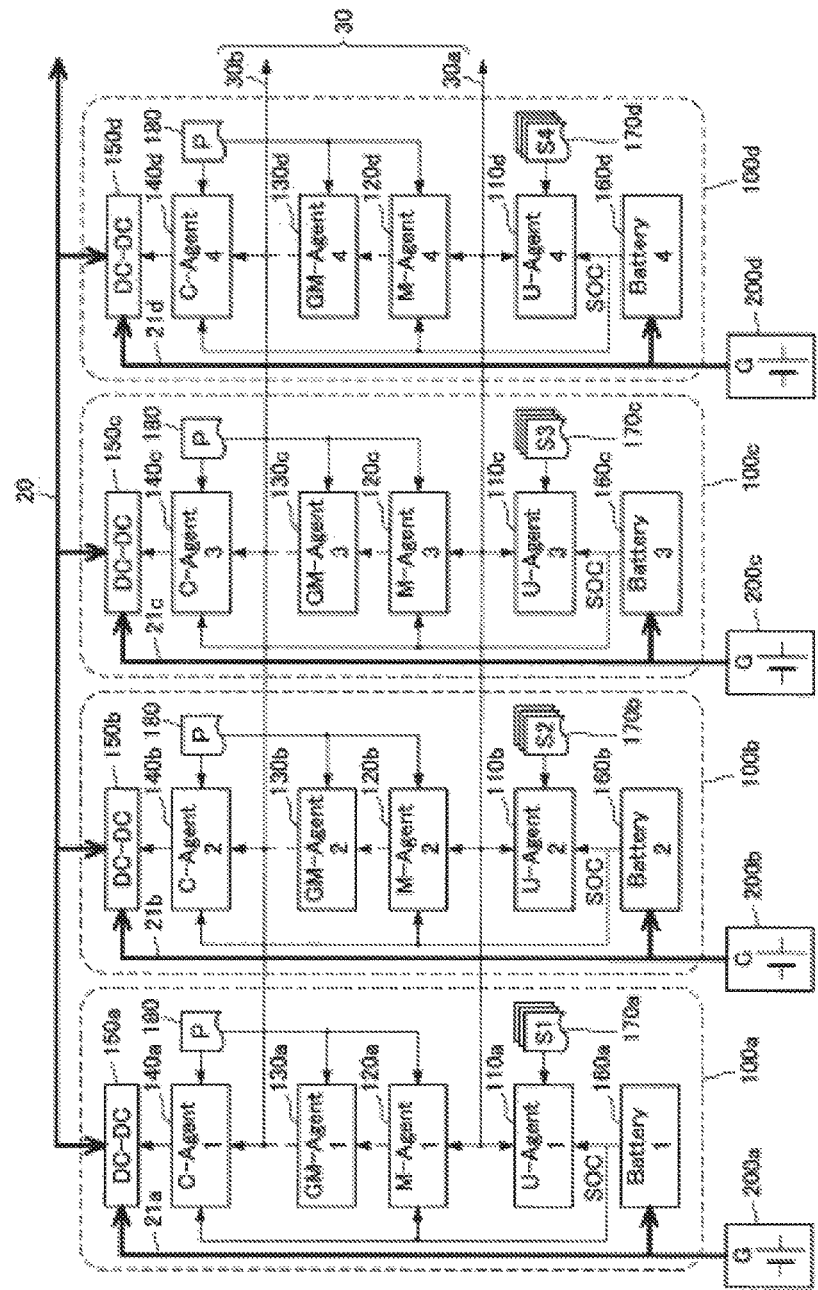
FIG. 4 is a diagram illustrated to describe an exemplary functional configuration of the power transmission and reception control system according to an embodiment of the present disclosure.

FIG. 4 is a diagram illustrated to describe an exemplary functional configuration of the power transmission and reception control system according to an embodiment of the present disclosure. An exemplary functional configuration of the power transmission and reception control system according to an embodiment of the present disclosure is described with reference to FIG. 4.

As illustrated in FIG. 4, the battery server 100a is configured to include a U-Agent 110a, an M-Agent 120a, a GM-Agent 130a, a C-Agent 140a, a DC-DC converter 150a, and a battery 160a. The battery servers 100b, 100c, and 100d have a configuration similar to that of the battery server 100a. Components that constitute the battery server 100a is described.

As illustrated in FIG. 4, the communication line 30 is separated into two paths (channels), that is, a communication line 30a and a communication line 30b. The communication lines 30a and 30b may be physically different wired communication lines, may be physically identical wired or wireless communication lines, or may be separated logically by authentication, encryption, or the like. As illustrated in FIG. 4, the communication line 30a allows the U-Agent 110a to communicate with other U-Agents 110b to 110d and allows the M-Agent 120a to communicate with other M-Agents 120b to 120d. The communication line 30b allows the GM-Agent 130a to communicate with other GM-Agents 130b to 130d, and the C-Agent 140a to communicate with other C-Agents 140b to 140d.

The power transmission and reception control system 1 according to the present embodiment uses separate communication lines for the U-Agent 110a and the M-Agent 120a and for the GM-Agent 130a and the C-Agent 140a as described above. Thus, the U-Agent 110a and the M-Agent 120a are prevented from delivering an instruction directly to the GM-Agent 130a and the C-Agent 140a. Moreover, the GM-Agent 130a and the C-Agent 140a are also prevented from delivering an instruction directly to the U-Agent 110a and the M-Agent 120a.

The U-Agent 110a periodically checks the state of charge (SOC) in the battery 160a. In a case where the state of charge in the battery 160a satisfies a predetermined condition, the U-Agent 110a requests the M-Agent 120a to receive power. Contents of the request to be delivered from the U-Agent 110a to the M-Agent 120a may include a voltage value or current value in receiving power, a time for receiving power (e.g., start time, end time, and duration), and a state of charge in the battery 160a that stops receiving power.

The U-Agent 110a refers to a scenario 170a to determine whether the state of charge in the battery 160 satisfies a predetermined condition. The scenario 170a describes a condition of the state of charge in the battery 160a, which is used for the U-Agent 110a to request the M-Agent 120a to receive power. The condition described in the scenario 170a may include contents of the U-Agent 110a requesting the M-Agent 120a to receive power if the state of charge in the battery 160a is lower than or equal to 20%.

The U-Agent 110a may have a function for editing contents of the scenario 170a based on a request from the user. The contents of the scenario 170a may be described in text, a markup language such as extensible markup language (XML), or a scripting language such as Lisp, Perl, and PHP. In a case where the contents of the scenario 170a are described in a scripting language, the contents of the scenario 170a may be described in a set of functions.

The scenario 170a may be edited using a text editor, a dedicated editor, or a web browser. The U-Agent 110a may be configured to operate a tool capable of editing the contents of the scenario 170a.

In the case where there is a request for supply of power from another battery server, a way of determining whether power transmission is permitted in response to the request depending on what condition is satisfied may be described in the scenario 170a. In one example, in the case where there is a request for supply of power from another battery server, contents in which power transmission is permitted in response to the request under the condition that the state of charge in the battery 160a is greater than or equal to 80% may be described as the condition of the scenario 170a. In one example, in the case where there is a request for supply of power from another battery server, contents in which power transmission is permitted in response to the request under the condition that the state of charge in the battery 160a is greater than or equal to 80% and the usage rate per hour of the power is lower than or equal to 10% may be described as the condition of the scenario 170a. In other words, the condition described in the scenario 170a may include not only the state of charge in the battery 160a but also the state of use of power stored in the battery 160a.

The contents of the scenario can be defined independently at the respective battery servers. Accordingly, the condition in which the power reception described above is requested or the condition in which power transmission is permitted in response to a request in the case where there is the request for supply of power from another battery server may be different for each battery server. Moreover, the number of scenarios to be defined in each battery server is not limited to only one. The scenario referred to by the U-Agent 110a may be switched into another, depending on the status.

In the case where the M-Agent 120a receives a request for power reception from the U-Agent 110a, the M-Agent 120a inquires of the M-Agents 120b, 120c, and 120d of the other battery servers about whether they are allowed to transmit power by performing communication with the M-Agents 120b, 120c, and 120d via the communication line 30a. In the case where the M-Agent 120a receives an inquiry about whether the M-Agent 120a is allowed to transmit power from the M-Agents 120b, 120c, and 120d of the other battery servers, the M-Agent 120a replies a response about whether power is allowed to be transmitted or not.

In the case where the M-Agent 120a receives an inquiry about whether the M-Agent 120a is allowed to transmit power from the M-Agents 120b, 120c, and 120d of the other battery servers, the M-Agent 120a may respond that power is allowed to be transmitted. In this case, if the GM-Agent 130a is not started, the M-Agent 120a inquires of the M-Agents 120b, 120c, and 120d of the other battery servers about whether the GM-Agents 130b, 130c, and 130d are being started via the communication line 30a. Although details will be described later, the GM-Agent 130a is started based on a start instruction from the M-Agent 120a and controls the DC-DC converters 150a to 150d of the battery servers to operate.

In the power transmission and reception control system 1 according to the present embodiment, only one of the GM-Agents 130a to 130d is permitted to start. Thus, if the GM-Agent 130a is not started, the M-Agent 120a determines that the battery server 100a does not have a right to control the power transmission and reception and inquires of the M-Agents 120b, 120c, and 120d of the other battery servers about whether they have the right to control the power transmission and reception, that is, whether they are started or not, via the communication line 30a. If there is a GM-Agent being started, the M-Agent 120a requests the GM-Agent being started to transmit and receive power through the M-Agent by which the GM-Agent is started. In one example, if the GM-Agent 130b is being started, the M-Agent 120a requests the M-Agent 120b to transmit and receive power through the M-Agent 120b.

On the other hand, if there is an inquiry about whether power transmission is allowed from the M-Agents 120b, 120c, and 120d of the other battery servers, it may be responded that the power transmission is allowed. In this case, if the GM-Agent 130a is being started, the response is replied together with information that the GM-Agent 130a is being started.

The M-Agent 120a notifies the C-Agent 140a to follow an instruction only from a GM-Agent of a battery server having the control right. In one example, the M-Agent 120a notifies identification information used to identify a GM-Agent of a battery server having the control right to the C-Agent 140a. The reception of the notification of identification information used to identify a GM-Agent of a battery server having the control right by the C-Agent 140a makes it possible for the C-Agent 140a to ignore an instruction from a GM-Agent that contains identification information other than the identification information.

The GM-Agent 130a is started and activated according to a start instruction from the M-Agent 120a, and the GM-Agent 130a is stopped and deactivated according to a stop instruction from the M-Agent 120a. The activated GM-Agent 130a controls the power transmission and reception by the DC-DC converters 150a to 150d through the C-Agents 140a to 140d via the communication line 30b based on the request for the power transmission and reception from the M-Agents 120a to 120d. When the requested power transmission and reception is completed, the GM-Agent 130a performs a process for releasing the control right. When the control right is released, the GM-Agent 130a is stopped and deactivated according to the stop instruction from the M-Agent 120a.

When the GM-Agent 130a receives a request for the power transmission and reception from the M-Agents 120a to 120d, the GM-Agent 130a acquires the power transmission and reception capacities of the respective battery servers 100a to 100d from the C-Agents 140a to 140d via the communication line 30b. Furthermore, the GM-Agent 130a calculates an amount of current in which power can be transmitted, from a total transmission current amount of the DC bus line 20. When an accumulated power transmission amount reaches a desired power transmission amount after power transmission is started, the GM-Agent 130a instructs the C-Agents 140a to 140d to stop transmitting power via the communication line 30b.

The C-Agent 140a controls the DC-DC converter 150a based on an instruction from the activated (i.e. having a control right) GM-Agent among the GM-Agents 130a to 130d. The C-Agent 140a receives the notification from the M-Agent 120a to follow only the instruction from a GM-Agent of a battery server having the control right. Thus, the C-Agent 140a controls the DC-DC converter 150a according to only the instruction from a GM-Agent of a battery server having the control right.

The C-Agent 140a periodically checks a parameter of the DC-DC converter 150a. When an abnormality occurs in the parameter of the DC-DC converter 150a, a warning is notified to a target transmitter or receiver of power.

The DC-DC converter 150a is connected to the battery 160a or the solar panel 200a via a local bus line 21a, and is connected to the DC-DC converters 150b to 150d of the other battery servers 100b to 100d via the DC bus line 20. The DC-DC converter 150a performs conversion of DC power between the DC bus line 20 and the local bus line 21a under the control by the C-Agent 140a.

The U-Agent 110a operates according to the scenario 170a defined independently in the respective battery servers 100a to 100d. The M-Agent 120a, the GM-Agent 130a, and the C-Agent 140a operate according to a common policy 180 in all of the battery servers 100a to 100d. Thus, the M-Agent 120a, the GM-Agent 130a, and the C-Agent 140a are not permitted to operate according to a rule different from the other battery servers 100b to 100d.

The contents of the policy 180 may be described in text, a markup language such as extensible markup language (XML), or a scripting language such as Lisp, Perl, and PHP. In the case where the contents of the policy 180 are described in a scripting language, the contents of the scenario 170a may be described in a set of functions.

The policy 180 may be edited using a text editor, a dedicated editor, or a web browser. As described above, the policy 180 is commonly referred to by all of the battery servers 100a to 100d, and thus the user is desirably unable to edit easily, but it may be possible that the user can edit as necessary. The M-Agent 120a, the GM-Agent 130a, or the C-Agent 140a may edit the policy 180 based on the rule defined in the policy 180.

Examples of the contents described in the scenario 170a may include as follows:

State of charge (SOC) level to request supply of power
SOC level to determine that power can be supplied
Technique for predicting and calculating battery residual amount with power consumption cycle in a day
Technique for predicting and calculating power generation amount in a week depending on acquisition of weather information
Calculation of reduction in AC power usage depending on power interchange Examples of the contents described in the policy 180 may include a document version, date of modification, a rule in modifying described contents, and respective rules defined for the M-Agents 120a to 120d, the GM-Agents 130a to 130d, and the C-Agents 140a to 140d.

Examples of rules defined for the M-Agents 120a to 120d may include as follows:

Determination condition and decision procedure for acquiring control right
Decision procedure for appeal from other devices
Procedure of checking survival of battery server joined in the power transmission and reception control system 1
Procedure of deleting registration of battery server previously joined in the power transmission and reception control system 1
List and authentication information of members joined in the power transmission and reception control system 1

Examples of the determination condition for acquiring a control right may include a condition in which a control right can be acquired if there is even one M-Agent being in favor and a condition in which a control right can be acquired if a majority is in favor. Examples of the decision procedure for acquiring a control right may include a decision procedure in which a command is broadcast to another M-Agent to acquire a control right and whether the control right is acquired is determined based on a response from the other M-Agent that returned an answer in a predetermined time. Similarly, examples of the decision procedure for appeal from other devices may include a decision procedure in which a command is transmitted to another M-Agent to acquire a control right and whether the control right is acquired is determined based on the contents of appeal from the other M-Agent that returned an answer in a predetermined time.

Examples of the procedure of checking survival of a battery server joined in the power transmission and reception control system 1 may include an example in which an M-Agent of the last battery server acquired the control right checks whether other battery servers are survived.

Examples of the procedure of deleting registration of a battery server previously joined in the power transmission and reception control system 1 may include a procedure of deleting registration information described in the policy 180 based on a command for requesting the deletion.

The list and authentication information of members joined in the power transmission and reception control system 1 are described in the policy 180, and thus the M-Agent can transmit various commands only to the joined member and can add authentication information thereto in transmitting the commands. Examples of the authentication information of a member may include address information of each battery server and an authentication key that is common to the battery servers.

Examples of a rule defined for the GM-Agents 130a to 130d may include as follows:

Information on state of connection of battery servers as viewed from their respective positions
Method of calculating current capacity based on information on state of connection of each battery server
Control procedure and limitations of DC-DC converter
Procedure from start to end for power transmission and reception in each battery server
Abandonment or transfer procedure of control right after supply of power is stopped
Processing procedure in case where abnormality is notified The DC power flows in the DC bus line 20, and thus the GM-Agents 130a to 130d are necessary to know a state of connection of the battery servers 100a to 100d to the DC bus line 20 and to decide how to supply power based on position information of the battery servers 100a to 100d. The state of connection of the battery servers 100a to 100d to the DC bus line 20 is described in the policy 180, and thus the GM-Agents 130a to 130d refer to the state of connection and control the DC-DC converters 150a to 150d.

Examples of the procedure of controlling a DC-DC converter may include contents of an instruction to be delivered to the DC-DC converter in converting DC power. Examples of the limitations of a DC-DC converter may include a range in which power can be converted.

Examples of the procedure from start to end for power transmission and reception in each battery server may include a procedure of increasing current at the start of the power transmission or reception and a procedure of decreasing current at the end of the power transmission or reception.

Examples of the abandonment or transfer procedure of a control right after supply of power is stopped may include a procedure in which, for example, if there is another battery server that supplies power, the control right is transferred to the other battery server.

Examples of the processing procedure in a case where abnormality is notified may include a procedure in which, if a battery server has a failure, the failed battery server is ignored and the processing proceeds.

Examples of a rule defined for the C-Agents 140a to 140d may include as follows:

Procedure of checking whether the control is continued by a GM-Agent of a battery server having a control right and processing procedure upon occurrence of abnormality Procedure of checking whether it is controlled simultaneously by a plurality of GM-Agents Processing procedure in case where it is controlled simultaneously by a plurality of GM-Agents Monitoring procedure of checking operations of a DC-DC converter and appropriately notifying the result to a GM-Agent of a battery server having the control right Examples of the procedure of checking whether the control is continued by a GM-Agent of a battery server having the control right may include a procedure of checking whether the control is performed by a GM-Agent at predetermined time intervals. Examples of the processing procedure upon occurrence of abnormality may include a procedure of notifying a GM-Agent of a battery server a control right that the control by the GM-Agent is interrupted for more than a predetermined time.

Examples of the procedure of checking whether it is controlled simultaneously by a plurality of GM-Agents may include a procedure of checking whether the control is performed by a GM-Agent having identification information different from identification information notified from the M-Agent. Examples of the processing procedure in the case where it is controlled simultaneously by a plurality of GM-Agents may include a procedure of ignoring the control by a GM-Agent having identification information different from identification information notified from an M-Agent and notifying a GM-Agent of a battery server having a control right that it is controlled simultaneously by the plurality of GM-Agents by dealing with the control from all of the GM-Agents as errors.

Examples of the monitoring procedure of checking operations of a DC-DC converter and appropriately notifying the result to a GM-Agent of a battery server having a control right may include a procedure of checking a parameter of a DC-DC converter at predetermined time intervals and notifying a parameter of the DC-DC convert to a GM-Agent of a battery server having a control right.

The policy 180 defined as described above allows the C-Agents 140a to 140d to deliver an instruction to stop transmitting power to the DC-DC converters 150a to 150d immediately when the instruction from the GM-Agent violates the contents of the policy 180.

The description contents of the above-mentioned scenario 170a or the policy 180 and examples of the description contents of the above-mentioned scenario 170a or the policy 180 are not limited to those described above. The description contents of the scenario 170a or the policy 180 may be changed appropriately depending on the configuration of the power transmission and reception control system 1 or the configuration of each of the battery servers 100a to 100d.

The battery 160a is composed of a rechargeable secondary battery. The battery 160a may be charged with power generated by the solar panel 200a or power supplied from the commercial supply of power (not shown). The battery 160a may be charged with power supplied from other battery servers 100b to 100d as necessary. The power stored in the battery 160a may be supplied to electric appliances such as air conditioner, refrigerator, washing machine, television set, and microwave, provided in the consumer 10a. Moreover, the power stored in the battery 160a may be supplied from the DC-DC converter 150a to other battery servers 100b to 100d depending on the request from the other battery servers 100b to 100d.

The battery servers 100a to 100d according to an embodiment of the present disclosure have the configuration as illustrated in FIG. 4, and thus only one battery server of them having a control right can control power transmission and reception of DC power to and from the other battery servers via the DC bus line 20. The battery servers 100a to 100d according to an embodiment of the present disclosure having the configuration as illustrated in FIG. 4 makes it possible to avoid an event that may occur in the case where the roles are simply shared between a master and a slave as described above and to manage efficiently the right to control the power transmission and reception of DC power. The battery servers 100a to 100d according to an embodiment of the present disclosure have the configuration as illustrated in FIG. 4, and thus it is possible to manage efficiently the right to control the power transmission and reception of DC power, thereby keeping the order of objects to be controlled among the battery servers.

The DC bus line 20 or the local bus lines 21a to 21d are not limited to the particular configuration. For example, the DC bus line 20 or the local bus lines 21a to 21d may be configured as a DC single-phase three-line bus line having two lines supplied with positive voltage and negative voltage and one line connected to the ground.

As described above, when the battery servers 100a to 100d according to an embodiment of the present disclosure come to an agreement on the power transmission and reception, the battery servers 100a to 100d serving as the power transmission side decide power transmission time that reflects the transmission loss and notify it to the battery servers 100a to 100d on the power reception side to allow the power reception side to determine it. If the battery servers 100a to 100d on the power reception side can accept the power transmission time, the battery servers 100a to 100d on the power transmission side transmit DC power to the battery servers 100a to 100d on the power reception side through the DC-DC converters 150 to 150d via the DC bus line 20 at the power transmission time that reflects the transmission loss.

In one example, the U-Agents 110a to 110d can operate as one example of a power supply request acquisition unit, a power supply request generator, or a power supply request transmitter according to an embodiment of the present disclosure. In one example, the M-Agents 120a to 120d can operate as one example of a transmission power decision unit or a transmission power information acquisition unit according to an embodiment of the present disclosure. This is certainly only an illustrative example, the battery servers 100a to 100d may be configured so that the U-Agents 110a to 110d may function as the transmission power decision unit according to an embodiment of the present disclosure.

In one example, in the case where DC power is transmitted from the battery server 100a to the battery server 100c via the DC bus line 20, the U-Agent 110c delivers a power request through the communication line 30a. This power request may include information relating to a total amount of power and the maximum value and maximum power reception time upon reception.

When the M-Agent 120a determines that the U-Agent 110a of the battery server 100a acquires a power request delivered from the U-Agent 110c and this meets the power request, the M-Agent 120a decides a parameter to be used in transmitting power from the battery server 100a to the battery server 100c. This parameter may include the maximum value of current in transmitting power and transmission time that reflects transmission loss. The M-Agent 120a transmits the decided parameter to the battery server 100c via the communication line 30a.

The battery server 100c determines contents of the parameter transmitted from the battery server 100a, for example, through the M-Agent 120c, and if it can be determined to be accepted, then transmits a response indicating that power transmission is accepted to the battery server 100a. The battery server 100a, when receiving the response from the battery server 100c, starts a process of sending DC power from the DC-DC converter 150a to the DC bus line 20.

The battery server 100a, when its own device has a right to control the DC bus line 20, instructs the GM-Agent 130a to control the DC-DC converter 150a through the C-Agent 140a. The battery server 100a, when its own device does not have a control right of the DC bus line 20, the battery server 100a requests a battery server having a right to control the DC bus line 20 to control the DC-DC converter 150a through the C-Agent 140a.

Figure 5:
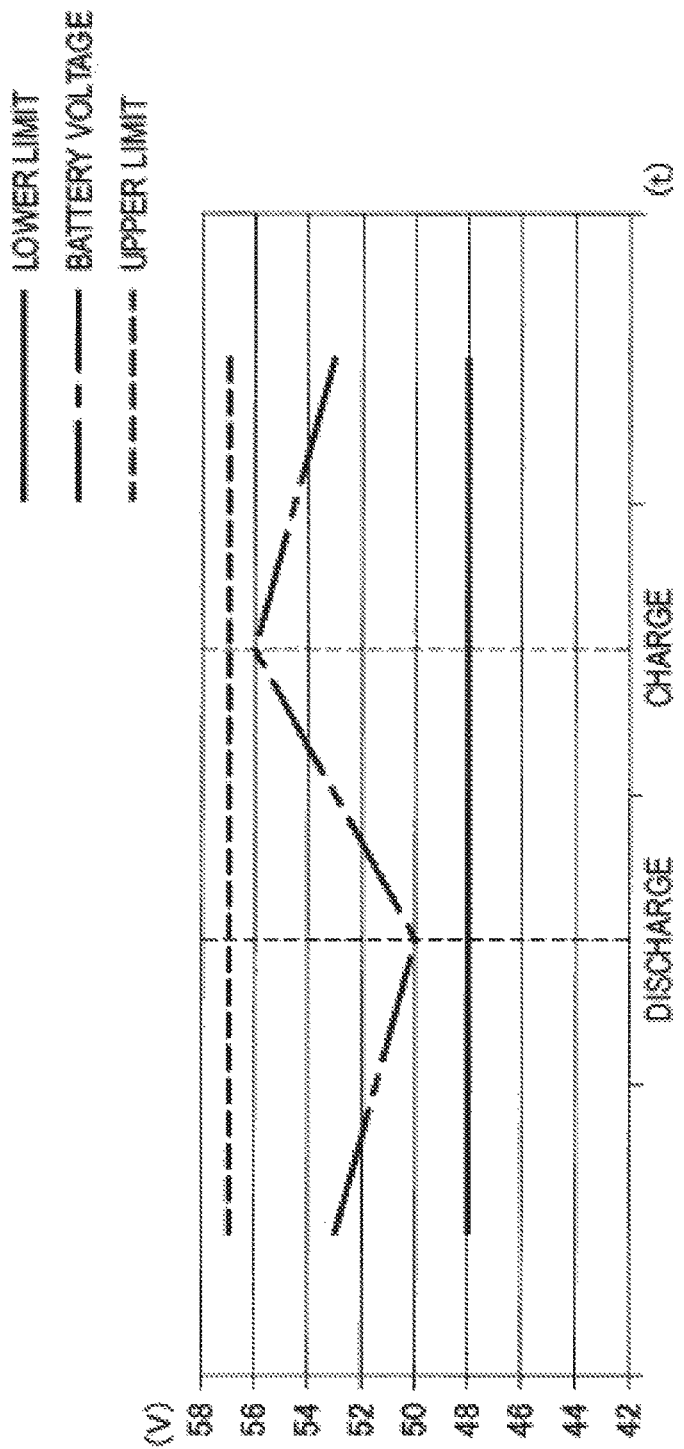
FIG. 5 is a diagram illustrated to describe a voltage range in which batteries 160*a* to 160*d* operate safely.

Each of the batteries 160a to 160d, which are provided respectively in the battery servers 100a to 100d, has a range of voltage in which its operation is performed safely. FIG. 5 is a diagram illustrated to describe a range of voltage in which the batteries 160a to 160d operate safely. FIG. 5 illustrates a range of voltage of 48 V to 57 V in which the batteries 160a to 160d operate safely. It is necessary for the batteries 160a to 160d to control the voltage to fall within the range of voltage with charging or discharging. If charging current or discharging current increases excessively, the voltage rises due to internal resistance of the batteries 160a to 160d, which disadvantageously leads to excess of the range of voltage.

Thus, the M-Agent 120a, when deciding a parameter to be used in transmitting power from the battery server 100a to the battery server 100c, may decide the parameter in consideration of the characteristics of the battery 160a. The U-Agent 110c, when delivering a power request, may generate the power request in consideration of the characteristics of the battery 160c.

The battery servers 100a to 100d serving as the power transmission side may acquire a status of power transmission and reception being performed in the DC bus line 20 and may decide a parameter to be used in transmitting DC power based on the status of power transmission and reception. In this case, in one example, the M-Agent 120s may acquire the status of power transmission and reception performed in the DC bus line 20 from a GM-Agent having a right to control the DC bus line 20. Thus, the M-Agent 120a can function as a power transmission status acquisition unit according to an embodiment of the present disclosure, in one example.

The exemplary functional configuration of the power transmission and reception control system according to an embodiment of the present disclosure has been described above with reference to FIG. 4. Subsequently, an exemplary operation of the power transmission and reception control system according to an embodiment of the present disclosure is described.

[1.3. Exemplary Operation]

Figure 6:
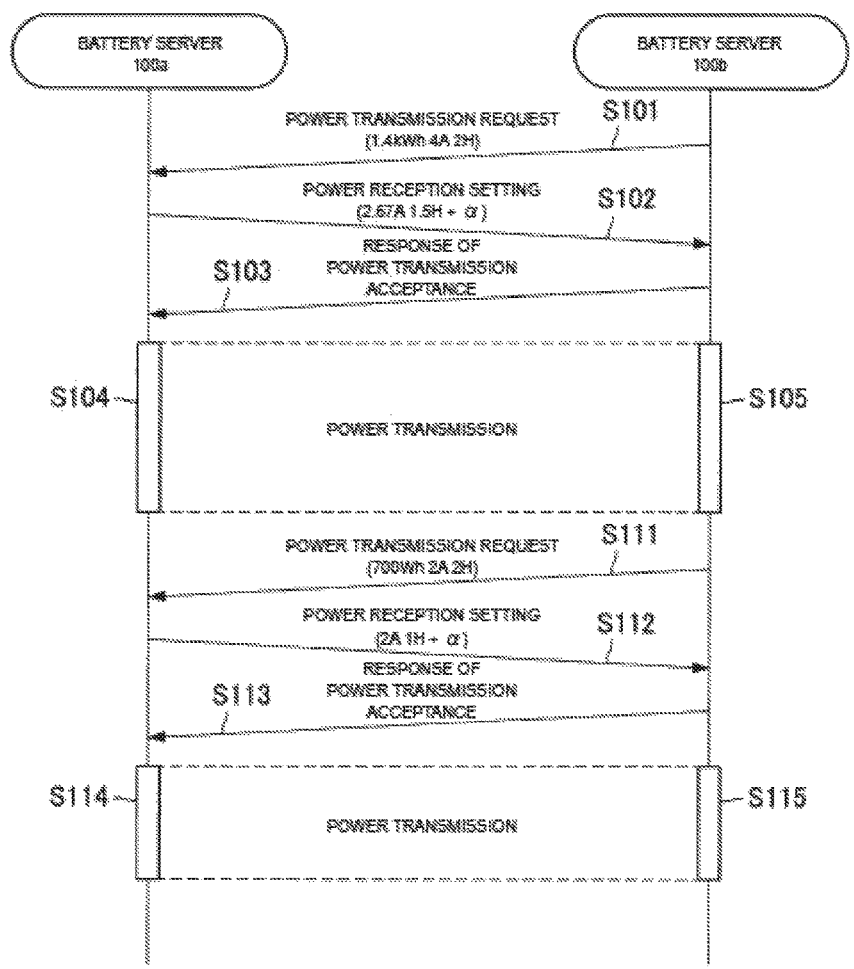
FIG. 6 is a flow diagram illustrating an exemplary operation of the power transmission and reception control system 1 according to an embodiment of the present disclosure.

FIG. 6 is a flow diagram illustrating an exemplary operation of the power transmission and reception control system 1 according to an embodiment of the present disclosure. FIG. 6 illustrates an exemplary operation in a case where power transmission is performed between the battery server 100a and the battery server 100b via the DC bus line 20 in the power transmission and reception control system 1 according to an embodiment of the present disclosure illustrated in FIG. 4. An exemplary operation of the power transmission and reception control system 1 according to an embodiment of the present disclosure is described with reference to FIG. 6.

The description of FIG. 6 is based on the assumption of the power transmission and reception control system 1 according to an embodiment of the present disclosure. In the DC bus line 20, a reference voltage is 350 V and the maximum current is 100 A. The battery servers 100a and 100b are provided with the DC-DC converters 150a and 150b, respectively, in which the maximum output is 2.5 kW and an average power transmission loss is 70 W, and provided with the batteries 160a and 160b, respectively, in which the maximum capacity is 3.6 kWh and the nominal voltage is 50 V.

In one example, if the SOC of the battery 160b provided in the battery server 100b becomes 40% and it is determined to be charged by the U-Agent 110b from an internal schedule, the U-Agent 110b transmits a power transmission request to the other battery servers via the communication line 30a (step S101). An example of the internal schedule may include various factors relating to power such as an operation schedule of equipment that uses the battery 160b and time at which charging to the battery 160b is made by a solar panel.

The U-Agent 110b, when transmitting a power transmission request to the other battery servers, generates the power transmission request in consideration of the characteristics of the battery 160b. In the example illustrated in FIG. 6, the U-Agent 110b generates a power transmission request indicating that the power of the total amount of power of 1.4 kWh is necessary to be received at a current of up to 4 A in two hours, and transmits the power transmission request to the other battery servers via the communication line 30a. The U-Agent 110b, when transmitting the power transmission request to the other battery servers, may generate a power transmission request in consideration of an allowable charge value of the battery 160b. The allowable charge value refers to the maximum current value allowed during charging, in one example.

The M-Agent 120a of the battery server 100a, when receiving the power transmission request transmitted from the battery server 100b via the communication line 30a, checks the SOC or an allowable discharge value of the battery 160a. If it is determined by the M-Agent 120a that power can be transmitted, the M-Agent 120a decides a parameter to be used in transmitting power from the battery server 100a to the battery server 100b. This parameter may include the maximum current value in transmitting power and power transmission time that reflects the transmission loss, in one example. The allowable discharge value refers to the maximum current value allowed during discharging, in one example. The M-Agent 120a transmits the decided parameter to the battery server 100b via the communication line 30a (step S102). In this step, the M-Agent 120a is assumed to decide that the power can be transmitted if the current is up to 2.67 A.

It is assumed that the battery 160a allows a current of up to 5 A in charging and up to 60 A in discharging in the case where the SOC is 60%, and the battery 160b allows a current of up to 30 A in charging and up to 50 A in discharging in the case where the SOC is 40%.

If there is no transmission loss, power transmission from the battery server 100a to the battery server 100b can be achieved in 1.5 hours, which is obtained by the expression, 1400/(350×2.67)≈1.5. However, as described above, transmission loss occurs in transmitting power from the battery server 100a to the battery server 100b. Thus, the M-Agent 120a calculates power transmission time not as 1.5 hours, but for example, as 1.6 hours, in consideration of the transmission loss.

The battery server 100b, when receiving the parameter from the battery server 100a, the M-Agent 120b of the battery server 100b determines whether power can be received under a condition that is set by the battery server 100a. The determination of whether power can be received under the condition that is set by the battery server 100a may be performed by the battery server 100b, based on a state of charge of the battery 160b or an allowable charge value of the battery 160b. If it is determined that power can be received under the condition that is set by the battery server 100a, the M-Agent 120b transmits a response of power transmission acceptance to the battery server 100a via the communication line 30a (step S103).

The battery server 100a, when receiving the response of power transmission acceptance from the battery server 100b, controls the DC-DC converter 150a to send DC power to the DC bus line 20 under the condition that is agreed between the battery server 100a and the battery server 100b (step S104). On the other hand, the battery server 100b controls the DC-DC converter 150b to receive DC power from the DC bus line 20 under the condition that is agreed between the battery server 100a and the battery server 100b (step S105).

The battery server 100a, when receiving the response of power transmission acceptance from the battery server 100b, instructs the GM-Agent 130a to control the DC-DC converter 150a through the C-Agent 140a when its own device has a right to control the DC bus line 20. The battery server 100a, when its own device does not have a right to control the DC bus line 20, requests a battery server having a right to control the DC bus line 20 to control the DC-DC converter 150a through the C-Agent 140a. Similarly, the battery server 100b, when its own device has a right to control the DC bus line 20, instructs the GM-Agent 130b to control the DC-DC converter 150b through the C-Agent 140b. The battery server 100b, when its own device does not have a right to control the DC bus line 20, requests a battery server having a right to control the DC bus line 20 to control the DC-DC converter 150b through the C-Agent 140b.

The different exemplary operations of the battery servers 100a and 100b have been illustrated with reference to FIG. 6. In one example, if the SOC of the battery 160b provided in the battery server 100b is 80% and it is determined to be charged by the U-Agent 110b, the U-Agent 110b transmits a power transmission request to the other battery server via the communication line 30a (step S111). The U-Agent 110b, when transmitting the power transmission request to the other battery servers, generates the power transmission request in consideration of the characteristics of the battery 160b. In the example illustrated in FIG. 6, the U-Agent 110b generates a power transmission request indicating that a power of the total amount of power of 700 Wh is necessary to be received at a current of up to 2 A in one hour, and transmits the power transmission request to the other battery server via the communication line 30a.

The M-Agent 120a of the battery server 100a, when receiving the power transmission request transmitted from the battery server 100b via the communication line 30a, checks the SOC of the battery 160a. If it is determined by the M-Agent 120a that power can be transmitted, the M-Agent 120a decides a parameter to be used in transmitting power from the battery server 100a to the battery server 100b. This parameter may include the maximum current value in transmitting power and power transmission time that reflects the transmission loss, in one example. The M-Agent 120a transmits the decided parameter to the battery server 100b via the communication line 30a (step S112). In this step, the M-Agent 120a is assumed to decide that the power can be transmitted at a current of up to 2 A.

It is assumed that the battery 160a allows a current of up to 20 A in charging and up to 60 A in discharging in the case where the SOC is 90%, and the battery 160b allows a current of up to 10 A in charging and up to 55 A in discharging in the case where the SOC is 80%.

If there is no transmission loss, power transmission from the battery server 100a to the battery server 100b can be achieved in one hour, which is obtained by the expression, 700/(350×2)=1. However, as described above, transmission loss occurs in transmitting power from the battery server 100a to the battery server 100b. Thus, the M-Agent 120a calculates power transmission time not as one hours, but for example, as 1.1 hours, in consideration of the transmission loss.

The battery server 100b, when receiving the parameter from the battery server 100a, the M-Agent 120b of the battery server 100b determines whether power can be received under the condition that is set by the battery server 100a. If it is determined that power can be received under the condition that is set by the battery server 100a, the M-Agent 120b transmits a response of power transmission acceptance to the battery server 100a via the communication line 30a (step S113).

The battery server 100a, when receiving the response of power transmission acceptance from the battery server 100b, controls the DC-DC converter 150a to send DC power to the DC bus line 20 under the condition that is agreed between the battery server 100a and the battery server 100b (step S114). On the other hand, the battery server 100b controls the DC-DC converter 150b to receive DC power from the DC bus line 20 under the condition that is agreed between the battery server 100a and the battery server 100b (step S115).

In the case where the battery server 100a serving as the power transmission side receives the power transmission request from the battery server 100b on the power reception side, if this request is 10 times or more than an average power transmission loss of the DC-DC converter 150a in one example, the battery server 100a may respond to the power transmission request. The battery server 100a serving as the power transmission side may respond power transmission current of a value that becomes less than or equal to the power transmission request amount with respect to the amount of maximum current that can be outputted by the power transmission side. The battery server 100b on the power reception side by which the power transmission is requested may send officially the power transmission request to the battery server 100a serving as the power transmission side when the power transmission current and the power transmission time have no problem for the internal schedule.

The exemplary operation of the power transmission and reception control system 1 according to an embodiment of the present disclosure has been described with reference to FIG. 6. Subsequently, an exemplary operation of the battery server 100a according to an embodiment of the present disclosure is described.

Figure 7:
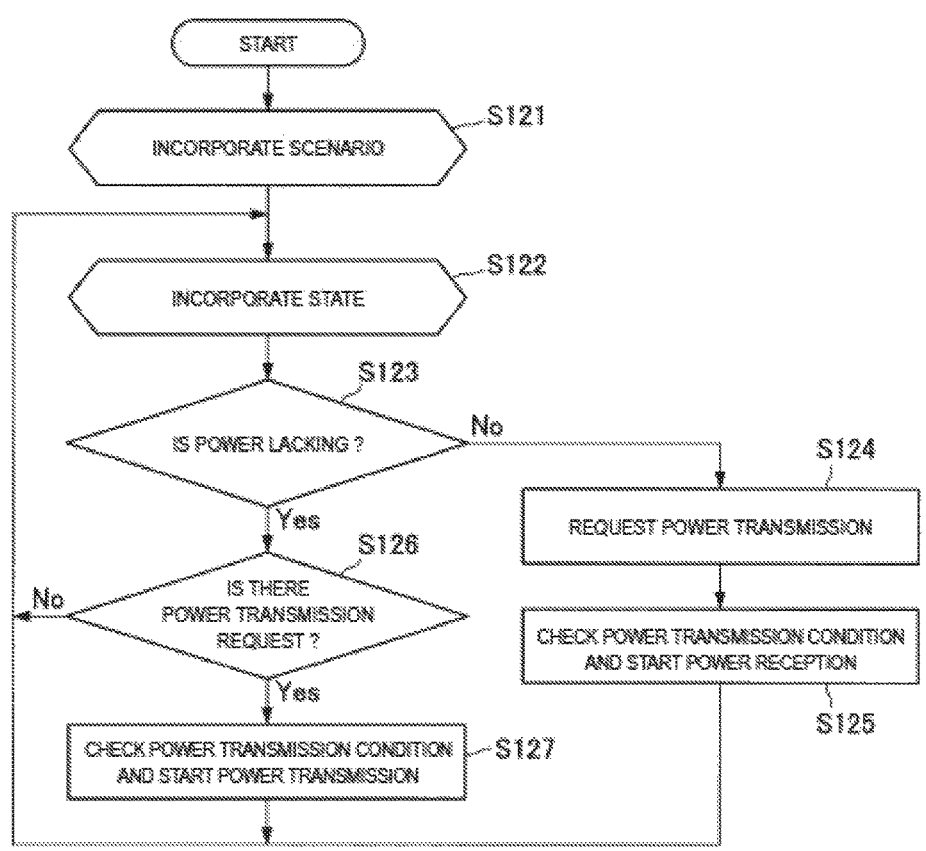
FIG. 7 is a flow diagram illustrating an exemplary operation of a battery server 100*a* according to an embodiment of the present disclosure.

FIG. 7 is a flow diagram illustrating an exemplary operation of a battery server 100a according to an embodiment of the present disclosure. FIG. 7 illustrates an exemplary operation performed from when the battery server 100a starts to when it performs power transmission and reception of DC power to and from another battery server. An exemplary operation of a battery server 100a according to an embodiment of the present disclosure is described with reference to FIG. 7.

The battery server 100a according to an embodiment of the present disclosure incorporates the scenario 170a when it starts (step S121). The incorporation of the scenario 170a in step S121 may be executed by the U-Agent 110a, in one example.

When the scenario 170a is incorporated in step S121, the battery server 100a incorporates periodically the current state of the battery 160a (step S122). The incorporation of the current state of the battery 160a in step S122 may be executed by the U-Agent 110a, in one example.

Subsequently, the battery server 100a determines whether the power stored in the battery 160a is lacking based on contents of the scenario 170a and the current state of the battery 160a (step S123). The determination of whether the power is lacking in step S123 may be executed by the U-Agent 110a, in one example.

If it is determined that the power stored in the battery 160a is lacking as a result of the determination in step S123 (Yes in step S123), then the battery server 100a requests other battery servers 100b to 100d to transmit DC power (step S124). The request to transmit DC power in step S124 may be executed by the U-Agent 110a, in one example.

If there is a response from the other battery servers 100b to 100d, the battery server 100a checks the power transmission condition sent from the other battery servers 100b to 100d. If there is no problem in the power transmission condition, the battery server 100a starts power reception of DC power from any of the other battery servers 100b to 100d via the DC bus line 20 (step S125).

If it is determined that the power stored in the battery 160a is lacking as a result of the determination in step S123 (Yes in step S123), then the battery server 100a determines whether there is a power transmission request of DC power from any of the other battery servers 100b to 100d (step S126). The determination of the presence or absence of power transmission request in step s126 may be executed by the U-Agent 110a, in one example.

If it is determined that there is a power transmission request of DC power from any of the other battery servers 100b to 100d as a result of the determination in step S126 (Yes in step S126), then the battery server 100a transmits a power transmission condition to any of the other battery servers 100b to 100d that transmit the power transmission request. The battery servers 100b to 100d on the power reception side check the power transmission condition, and if there is no problem in the power transmission condition, the battery server 100a starts power transmission of DC power to the other battery servers 100b to 100d via the DC bus line 20 (step S127).

If it is determined that there is no power transmission request of DC power from any of the other battery servers 100b to 100d as a result of the determination in step S126 (No in step S126), then the battery server 100a returns to the process of incorporating the current state of the battery 160a in step S122. The battery server 100a executes the process of incorporating the current state of the battery 160a at predetermined intervals (in one example, five-minute intervals).

The exemplary operation of the battery server 100a according to an embodiment of the present disclosure has been described with reference to FIG. 7. Although only the exemplary operation of the battery server 100a has been described with reference to FIG. 7, a similar operation is certainly executed for the other battery servers 100b to 100d.

2. Conclusion

According to an embodiment of the present disclosure as described above, there is provided the battery servers 100a to 100d configured to decide power transmission time that reflects transmission loss when transmission and reception of power is agreed.

The battery servers 100a to 100d serving as the power transmission side decide power transmission time that reflects the transmission loss and notify it to the battery servers 100a to 100d on the power reception side to allow the power reception side to determine it. If the battery servers 100a to 100d on the power reception side can accept the power transmission time, the battery servers 100a to 100d on the power transmission side transmit DC power to the battery servers 100a to 100d on the power reception side via the DC bus line 20 at the power transmission time that reflects the transmission loss.

The decision of the power transmission time that reflects transmission loss by the battery servers 100a to 100d according to an embodiment of the present disclosure makes it possible to supply properly the amount of power previously agreed between the power transmission side and the power reception side when customers supply each other with DC power.

Although, in the embodiments described above, only one of the battery servers 100a to 100d is configured to have a right to control the DC bus line 20, the present disclosure is not limited thereto. Any particular limitation is not subject to other configurations of the battery servers 100a to 100d as long as the other configurations are configured to decide power transmission time that reflects transmission loss when transmission and reception of power is agreed.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, the hardware configuration of each function block shown in functional block diagrams allows a series of processes to be implemented in hardware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A DC power transmission device including:
a power supply request acquisition unit configured to acquire a power supply request from a DC power reception device, the DC power reception device being configured to receive DC power from a DC bus line; and
a transmission power decision unit configured to decide a parameter of DC power to be outputted to the DC power reception device via the DC bus line based on the power supply request and a characteristic of a power storage device, the power storage device being configured to supply DC power to the DC bus line,
wherein the parameter includes power transmission time of DC power that reflects a power transmission loss occurred until DC power reaches the DC power reception device.

(2)
The DC power transmission device according to (1), further including:
a power transmission status acquisition unit configured to acquire a power transmission status of another device that is transmitting DC power to the DC bus line,
wherein the transmission power decision unit decides the parameter of DC power to be outputted to the DC bus line also based on the power transmission status.

(3)
The DC power transmission device according to (2),
wherein the characteristic of the power storage device is a state of charge of the power storage device.

(4)
The DC power transmission device according to (2) or (3),
wherein the characteristic of the power storage device is an allowable discharge value of the power storage device.

(5)
The DC power transmission device according to any of (1) to (4),
wherein the parameter includes information on an amount of maximum current of DC power to be outputted to the DC bus line.

(6)
The DC power transmission device according to any of (1) to (5),
wherein the transmission power decision unit decides the parameter of DC power to be outputted to the DC bus line also based on an amount of power included in the power supply request.

(7)
A DC power reception device including:
a power supply request generation unit configured to generate a power supply request based on a characteristic of a power storage device, the power storage device being configured to store a received power;
a power supply request transmitting unit configured to transmit the power supply request to a DC power transmission device, the DC power transmission device being configured to transmit DC power to a DC bus line; and a power transmission information acquisition unit configured to decide a parameter of DC power to be generated by the DC power transmission device and transmitted from the DC power transmission device,
wherein the parameter includes power transmission time of DC power that reflects a power transmission loss occurred until DC power transmitted from the DC power transmission device reaches.

(8)
The DC power reception device according to (7),
wherein the characteristic of the power storage device is a state of charge of the power storage device.

(9)
The DC power reception device according to (7) or (8),
wherein the characteristic of the power storage device is an allowable charge value of the power storage device.

(10)
A DC power transmission system including:
a DC power reception device configured to receive DC power from a DC bus line; and
a DC power transmission device configured to transmit DC power to the DC bus line,
wherein the DC power reception device includes
a power supply request generation unit configured to generate a power supply request based on a characteristic of a first power storage device, the first power storage device being configured to store a received power,
a power supply request transmitting unit configured to transmit the power supply request to the DC power transmission device, and
a power transmission information acquisition unit configured to decide a parameter of DC power to be generated by the DC power transmission device and transmitted from the DC power transmission device,
the DC power transmission device includes
a power supply request acquisition unit configured to acquire the power supply request from the DC power reception device, and
a transmission power decision unit configured to decide said parameter of DC power to be outputted to the DC power reception device via the DC bus line based on the power supply request and a characteristic of a second power storage device, the second power storage device being configured to supply DC power to the DC bus line, and
the parameter includes power transmission time of DC power that reflects a power transmission loss occurred until DC power transmitted from the DC power transmission device reaches.

REFERENCE SIGNS LIST 1 power transmission and reception control system
10$a$-$d$ customer
20 DC bus line
21$a$-$d$ local bus line
30, 30$a$, 30$b$ communication line
100$a$-$d$ battery server
150$a$-$d$ DC-DC converter
160$a$-$d$ battery
170$a$-$d$ scenario
180 policy
200$a$-$d$ solar panel

The invention claimed is:

1. A DC power transmission device, comprising:
   a power supply request acquisition unit configured to acquire a power supply request from a DC power reception device, the DC power reception device being configured to receive DC power from a DC bus line; and
   a transmission power decision unit configured to decide a parameter of the DC power to be outputted to the DC power reception device via the DC bus line based on the power supply request and a characteristic of a power storage device, the power storage device being configured to supply the DC power to the DC bus line,
   wherein the parameter includes power transmission time of the DC power that reflects a power transmission loss occurred until the DC power reaches the DC power reception device.

2. The DC power transmission device according to claim 1, further comprising:
   a power transmission status acquisition unit configured to acquire a power transmission status of another device that is transmitting the DC power to the DC bus line,
   wherein the transmission power decision unit decides the parameter of the DC power to be outputted to the DC bus line also based on the power transmission status.

3. The DC power transmission device according to claim 2,
   wherein the characteristic of the power storage device is a state of charge of the power storage device.

4. The DC power transmission device according to claim 2,
   wherein the characteristic of the power storage device is an allowable discharge value of the power storage device.

5. The DC power transmission device according to claim 1,
   wherein the parameter includes information on an amount of maximum current of the DC power to be outputted to the DC bus line.

6. The DC power transmission device according to claim 1,
   wherein the transmission power decision unit decides the parameter of the DC power to be outputted to the DC bus line also based on an amount of power included in the power supply request.

7. A DC power reception device, comprising:
   a power supply request generation unit configured to generate a power supply request based on a characteristic of a power storage device, the power storage device being configured to store a received power;
   a power supply request transmitting unit configured to transmit the power supply request to a DC power transmission device, the DC power transmission device being configured to transmit DC power to a DC bus line; and
   a power transmission information acquisition unit configured to decide a parameter of the DC power to be generated by the DC power transmission device and transmitted from the DC power transmission device,
   wherein the parameter includes power transmission time of the DC power that reflects a power transmission loss occurred until the DC power transmitted from the DC power transmission device reaches.

8. The DC power reception device according to claim 7,
   wherein the characteristic of the power storage device is a state of charge of the power storage device.

9. The DC power reception device according to claim 7,
   wherein the characteristic of the power storage device is an allowable charge value of the power storage device.

10. A DC power transmission system, comprising:
    a DC power reception device configured to receive DC power from a DC bus line; and
    a DC power transmission device configured to transmit the DC power to the DC bus line,
    wherein the DC power reception device includes:
       a power supply request generation unit configured to generate a power supply request based on a characteristic of a power storage device, the power storage device being configured to store a received power,
       a power supply request transmitting unit configured to transmit the power supply request to the DC power transmission device, and
       a power transmission information acquisition unit configured to decide a parameter of the DC power to be generated by the DC power transmission device and transmitted from the DC power transmission device,
    the DC power transmission device includes:
       a power supply request acquisition unit configured to acquire the power supply request from the DC power reception device, and
       a transmission power decision unit configured to decide said parameter of the DC power to be outputted to the DC power reception device via the DC bus line based on the power supply request and a characteristic of a power storage device, the power storage device being configured to supply the DC power to the DC bus line, and
    the parameter includes power transmission time of the DC power that reflects a power transmission loss occurred until the DC power transmitted from the DC power transmission device reaches.

* * * * *